Aug. 21, 1962

N. SHACKMAN 3,049,791

METHOD FOR CLADDING AN EXTRUDED STUD

Filed Oct. 9, 1956

INVENTOR.
NORMAN SHACKMAN

BY Ostrolenk, Faber,
Gerb & Soffen
ATTORNEYS

Aug. 21, 1962  N. SHACKMAN  3,049,791
METHOD FOR CLADDING AN EXTRUDED STUD
Filed Oct. 9, 1956  2 Sheets-Sheet 2
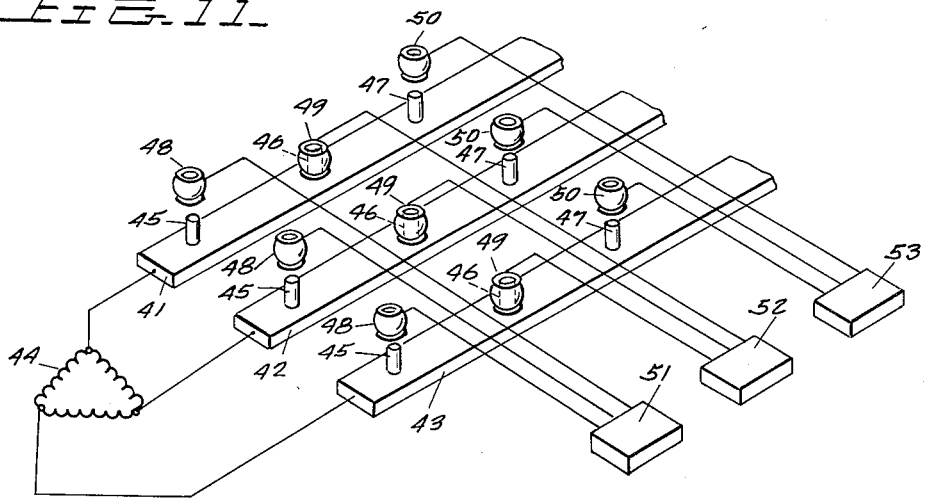
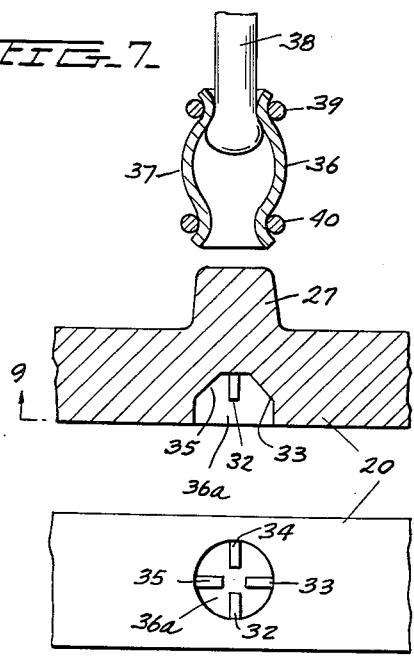
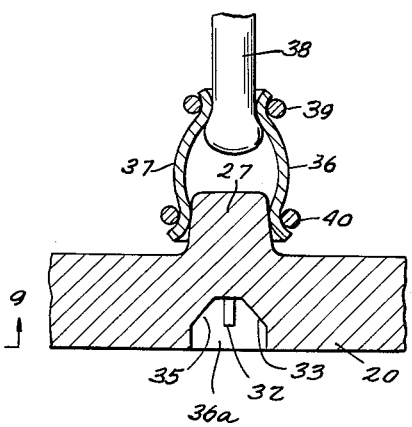
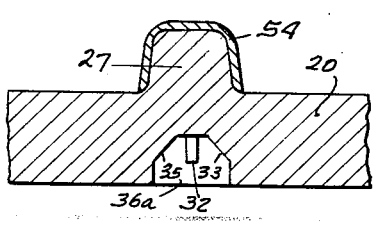
INVENTOR.
NORMAN SHACKMAN
BY Ostrolenk, Faber,
Gerb & Soffen
ATTORNEYS

United States Patent Office 3,049,791
Patented Aug. 21, 1962

3,049,791
METHOD FOR CLADDING AN EXTRUDED STUD
Norman Shackman, Oak Park, Mich., assignor, by mesne assignments, to I-T-E Circuit Breaker Company, Philadelphia, Pa., a corporation of Pennsylvania
Filed Oct. 9, 1956, Ser. No. 614,956
1 Claim. (Cl. 29—155.55)

This invention relates to a novel method for coating at least a portion of the external surface of a stud with a material having properties more desirable in a particular application than the material comprising the stud.

Although my novel method is useful in many applications of a non-electrical nature, it will be described herein in conjunction with electrical connecting studs as illustrated.

In the past, removable electrical connection to bus bars in electrical distribution systems has been made by bolted connections through interconnecting straps or by plug-in connections to studs which protrude from the bus bars and are fastened thereto by some means, such as by welding or by a threaded engagement between the stud and the bus bar. In each case, however, it is necessary to accurately machine the bus bar to allow this stud or bolt connection to be made thereto. Furthermore, there will be contact resistance between the bolt or stud connection and the bus which will lead to local heating upon the passage of current through the connection.

The principle of the invention set forth in co-pending U.S. application Serial No. 614,955 filed October 9, 1956, and assigned to the assignee of the instant invention, is to extrude connecting studs at desired points along a bus bar wherein the extruded stud and bus bar are integral or continuous components. The stud then provides a plug-in type cooperation with respect to electrical apapratus which is to be connected to the bus, wherein the electrical apparatus is provided with cooperating connecting means such as a tulip clip type connector for cooperating with the stud. Hence, this invention overcomes the prior difficulties of expensive machining of the bus and eliminates problems of local heating at the point of connection between the stud and the bus.

The novel method of my invention further provides a way of metallurgically cladding or coating at least a portion of the external surface of the stud with a material which is more resistant to corrosion due to ambient atmospheric conditions and abrasion due to connection and disconnection than is the bus material. Similarly, this cladding material could have properties which would be a better base for soldering, brazing, welding or similar operation than the material of the bus and stud itself.

By way of example, when an aluminum bus bar has a stud extruded therefrom in accordance with this novel method, the aluminum stud may be simultaneously clad with a copper or silvered copper surface or any other surface having the desired electrical or mechanical connecting properties. Similarly, a bus bar made of copper could have a silver coating metallurgically clad thereon.

The extruded stud of the above noted application is obtained by placing a body such as a bus bar between a punch and a die wherein the diameter of the punch exceeds the diameter of the opening in the die. When the punch and die are then brought together, the bus bar material is caused to flow into the die opening to a depth determined by the relative displacement between the die and the punch.

In order to facilitate this flow process and obtain a final structure in which the stud and bus bar are an integral body, it has been found desirable to round the periphery of the edge of the die opening adjacent to the bus bar being extruded.

To mechanically strengthen the junction between the stud and the body from which the stud is extruded, it has been further found that the punch may be provided with at least one, and preferably a plurality of grooves extending from the tip of the punch. Hence, the forming process, a plurality of ridges which conform to the position of the grooves in the tip of the punch, will form a bridge between the stud material and the bus bar material. These ridges, which are also integral parts of the unitary stud and bus bar, will therefore serve to brace the extruded stud with respect to the body from which it is extruded.

As has been set forth above, it is often desirable to bond a material to a stud connecting device which has a better resistance to corrosion and abrasion than does the bus material. Thus, in the case of an aluminum bus bar having aluminum studs extruded therefrom, it is desirable that the studs be clad with a material such as copper or silvered copper which would provide a better contact surface than the aluminum.

Furthermore, it is desirable that the cladding material withstand abrasion due to repeated connection and disconnection of the stud better than the aluminum stud surface. Clearly, the same remarks could be directed to a copper bus or a bus of any other conducting material wherein it would be desirable to bond a material having superior properties of both an electrical and mechanical nature to its connecting studs.

In the past, this coating surface has been obtained by plating processes which require adequate controls to ensure a substantially non-porous coating of adequate thickness to withstand corrosion and abrasion of the cooperating conecting device such as a tulip clip connector.

In accordance with this invention, however, the desired coating material is metallurgically clad to the stud during the extrusion of the stud. More specifically, a sheet of cladding material is inserted between the body to be extruded and the die opening. When the punch and die are then brought together and the stud is formed, the stud is simultaneously metallurgically clad with the thin sheet of cladding material.

While this mechanism of cladding is not fully understood, it appears that the joining of metals occurs at the die radius as the metals flow together under high pressure, the bonded area between the two metals being greater than that obtained by other pressure welding techniques.

It has further been found that the bonding between the two materials is substantially obtained only when adjacent surfaces of the materials are abraded. This abrasion or cleaning of the surfaces prior to their joining has been found to be effective even though the abrasion has been performed long in advance of the cladding operation. By way of example, cladding performed one week after abrasion has been found to be satisfactory.

Accordingly, a primary object of this invention is to provide a novel method for metallurgically cladding an extruded stud.

A further object of this invention is to place a sheet of cladding material between a die opening having rounded corners and the body to be extruded whereby the cladding material and the extruded stud are bonded together during the extrusion process.

A still further object of this invention is to abrade adjacent surfaces of a body to be extruded and a cladding sheet of material which is to be bonded to the extruded stud, and to thereafter perform the extrusion into a die opening having a smaller diameter than the diameter of the punch.

These and other objects of this invention will become apparent from the following description when taken in conjunction with the drawings, in which:

FIGURE 7 shows a cross-sectional view of the stud extruded by the method of FIGURES 1 and 2 with the punch of FIGURES 3 and 4 in coordination with a tulip clip type connecting means.

FIGURE 8 is similar to FIGURE 7 and shows the tulip clip connecting means in engagement with the extruded stud.

FIGURE 9 is a view of FIGURE 7 along the lines 9—9 and particularly shows the reinforcing ridges which are continuous with and mechanically strengthen the junction between the extruded stud and the body.

FIGURE 10 shows a cross-sectional view of a stud which is extruded and metallurgically clad by the method shown in FIGURES 5 and 6 with the punch of FIGURES 3 and 4.

FIGURE 11 shows an application of buses having studs extruded therefrom to a three-phase bus distribution.

Figure 1:
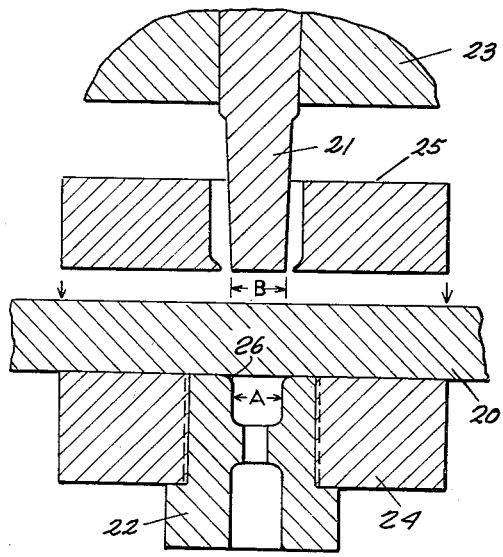
FIGURE 1 shows a die and punch prior to the extrusion of a body to be extruded by the cooperating die and punch.

Referring first to FIGURE 1, a body 20 which is to have studs extruded therefrom by the method of U.S. co-pending application Serial No. 614,955 filed October 9, 1956, heretofore referred to, is positioned between a punch 21 and a die buton 22. The body 20 could be an aluminum or copper bus bar or any other extrudable body which is to have a portion thereof extruded above its surface. The punch 21 is supported by an operating member 23 which will move the punch 21 toward and away from its cooperating die button 22 while the die button 22 is shown as being threaded in a die section 24.

A stripper means 25 is then connected so as to be movable with the punch 21 in such a manner that it will maintain the body 20 to be extruded in a fixed position during extrusion of body 20 and while the punch 21 is being withdrawn.

It is to be noted that the details of construction and operation of the support of punch 21, stripper 25 and die button 22 could be of any desired type and will not be described herein.

In acordance with this invention, the diameter of punch 21 is made larger than the internal diameter of the opening in the die button. That is to say, the dimension B in FIGURE 1 is made greater than the dimension A.

Figure 2:
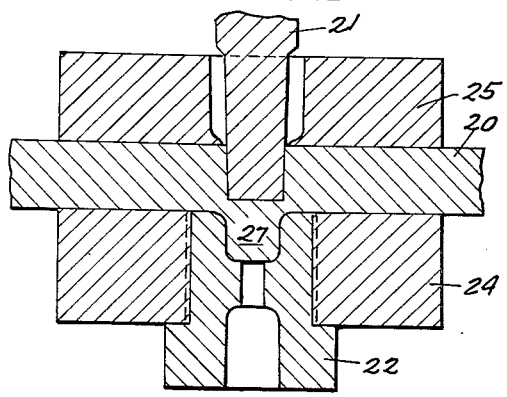
FIGURE 2 shows the structure of FIGURE 1 after extrusion of a stud from the body.

This novel construction ensures proper flow characteristics of the material of body 20 when the punch 21 and die button 22 are in relative motion towards one another and to the position of FIGURE 2. To further enhance flow characteristics, the periphery of the die button opening adjacent to the body 20 which is to be extruded has a rounded edge 26.

Thus it may be seen in FIGURE 2, as the punch 21 is moved into punching relationship with respect to the die button 22, a stud 27 is formed by a flow of material of the body 20 into the opening of die button 22. Clearly, the cross-sectional dimensions of the stud 27 is determined by the cross-sectional configuration of the die button opening while the length of stud 27 is determined by penetration or depth to which the punch 21 is moved. However, regardless of the depth of the stud 27, the stud 27 and the body 20 will be integral or continuous parts.

Figure 3:
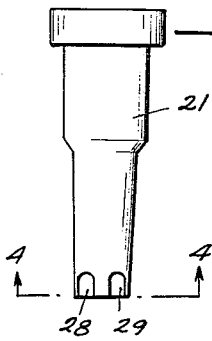
FIGURE 3 shows a punch which could be used in the device of FIGURES 1 and 2 wherein a plurality of grooves extend from the tip of the punch.
Figure 4:
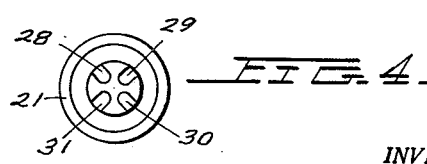
FIGURE 4 is a view of FIGURE 3 taken along the lines 4—4.

If it is desired to reinforce the junction between the stud 27 and the body 20, it has been found that punch 21 of FIGURES 1 and 2 may be constructed as seen in FIGURES 3 and 4, to have grooves such as grooves 28, 29, 30 and 31 extend from the tip of punch 21.

The stud extruded by the grooved punch of FIGURES 3 and 4 is shown in FIGURES 7, 8 and 9 where it is seen that ridges 32, 33, 34 and 35 are formed during the extrusion. More particularly, FIGURES 7, 8 and 9 show that the body 20 which has the stud 27 extruded therefrom is further provided with reinforcing ridges 32, 33, 34 and 35 within the opening 36 formed by the entrance of the punch 21. Ridges 32, through 35 which cooperate with grooves 28 through 31 of punch 21 of FIGURES 3 and 4 would therefore serve to reinforce stud 27 with respect to the body 20, these ridges being an integral or continuous part of both the stud and the body from which it is extruded.

FIGURES 7 and 8 further show the manner in which studs 27 could cooperate with a connecting means such as a tulip clip type connector. Referring first to FIGURE 7 which shows the tulip clip connector disconnected from stud 27, spring type fingers 36 and 37 are maintained in engagement with connecting member 38 which is to lead electrical power from the bus 20 to any desired electrical equipment.

The flexible current carrying spring members 36 and 37 are mtaintained to the conductor 38 by the spring means 39 while the other end of fingers 36 and 37 are biased to have a relatively small radius by means of the spring 40. When it is desired to connect member 38 to the bus 20, the tulip clip conductor is merely forced into engagement with stud 27 as may be sen in FIGURE 8 where the biasing spring 40 is extended to allow the envelopment of stud 27 by the contact fingers 36 and 37.

Reference to FIGURE 11 illustrates one application of buses which have connecting studs extruded therefrom for cooperation with tulip clip type connectors of the type shown in FIGURES 7 and 8. FIGURE 11 shows bus bars 41, 42 and 43 as being energized from any desired power source, such as three-phase power source 44. Each of bus bars 41, 42 and 43 have studs such as studs 45, 46 and 47 extruded therefrom in accordance with this invention.

It is to be understood that studs 45, 46 and 47 could be extruded simultaneously by providing a punch and a die structure of the type of FIGURES 1 and 2 which contains three punches and three cooperating buttons which are spaced as required. In a similar manner, any desired number of studs may be extruded from a single body in any desired spacing by merely spacing the desired number of punches and cooperating die buttons in the desired manner. However, studs 45, 46 and 47 need not be extruded simultaneously and could be extruded independently of one another.

Each individual stud 45, 46 and 47 of buses 41, 42 and 43 is then connectible to the tulip clip type connectors 48, 49 and 50 respectively. Tulip clip connector 48 would then serve to connect the load 51 to buses 41, 42 and 43 through their studs 45. This connected condition is shown in FIGURE 11 for tulip clip conductors 49 which are connected to their corresponding studs 46 to energize load 52 from power source 44. In a similar manner, tulip clip type connector 50 could be connected to stud 47 to thereby energize load 53 from source 44.

As has been previously set forth, it may be desirable to coat stud 27 of FIGURES 2, 7 and 8 with a material less subject to corrosion and abrasion than is the parent material of body 20. This invention provides a novel method for metallurgically cladding such a protective material to the stud as shown in conjunction with FIGURES 5 and 6.

Figure 5:
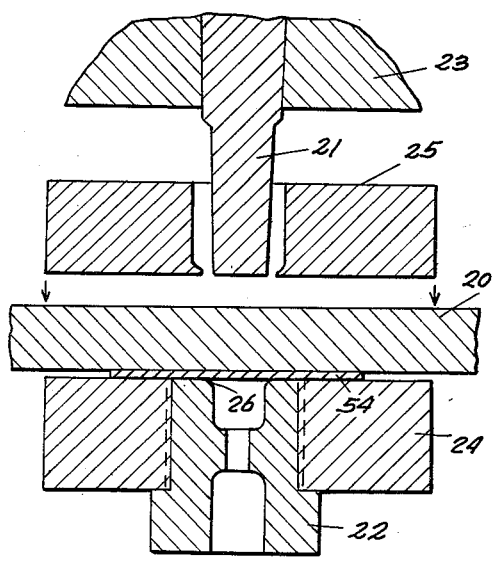
FIGURE 5 is similar to FIGURE 1 but shows a sheet of cladding material in position to be metallurgically clad with the stud extruded from the body of FIGURE 5 in accordance with this invention.
Figure 6:
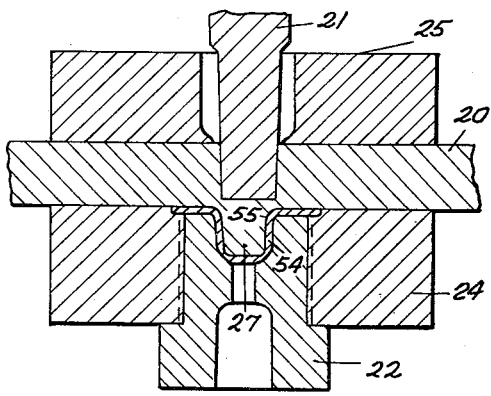
FIGURE 6 shows the structure of FIGURE 5 after the extrusion process is completed.

In FIGURES 5 and 6, it is seen that substantially the same structure is utilized as was utilized in the case of FIGURES 1 and 2 which described the extrusion of the stud and like parts have been identified with similar numerals. FIGURE 5, however, shows that a sheet of cladding material 54 is positioned between the body 20 which is to be extruded and the opening of die button 22. Thus, when punch 21 is brought from the position of FIGURE 5 to the position of FIGURE 6, the cladding material 54 will be drawn over the rounded surface 26 of die button 22 and will be metallurgically clad to at least a portion of the external surface of stud 27 of FIGURE 6.

More specifically, at least a portion of a cylindrical surface 55 of the stud 27 will have the material of sheet 54 bonded thereto. The flanged portion of sheet 54 which has not been drawn into the opening of die button 22 may then be trimmed to give a cross-sectional configuration to the clad stud which is similar to that seen in FIGURE 10.

FIGURE 10 further indicates that the punch of FIGURES 3 and 4 having grooves extending from its tip may be utilized to produce the reinforcing ridges such as ridges 32, 33 and 35.

Clearly, an electrical bus bar constructed in accordance with the method set forth in conjunction with FIGURES 5, 6 and 10 is connectible by means of tulip clip connectors in the same manner as has been seen in FIGURES 7, 8 and 11. Hence if body 20 were an aluminum bus bar, the coating 54 could be a coating of copper or silvered copper which would give the desired corrosion and abrasion resistance required of the connecting stud 27.

Although preferred embodiments of this novel invention have been described here, many variations and modifications will now be obvious to those skilled in the art and I therefore prefer to be limited not by the specific disclosure herein, but only by the appended claims.

I claim:

A method of forming a stud in a body by utilizing a die and a punch with said die having an opening with a rounded edge and said punch being aligned with said opening and having a larger diameter than the inner diameter of the opening; said method comprising the steps of placing the body between said punch and said die external of said opening; inserting a sheet of cladding material of larger size than said opening between said body and said die and entirely external of said opening; effecting relative motion of said die and said punch toward one another prior to securement of said cladding material to said body thereby forcing material of said body past said rounded edge into said opening whereby a stud is formed with cladding material along the side of the stud and metallurgically clad to at least a portion of said stud external surface.

References Cited in the file of this patent

UNITED STATES PATENTS

| | | |
|---|---|---|
| 1,105,489 | Clement | July 28, 1914 |
| 1,744,810 | Shallcross | Jan. 28, 1930 |
| 1,950,938 | Dunn et al. | Mar. 13, 1934 |
| 1,962,804 | Cassady | June 12, 1934 |
| 2,226,819 | Jeffries | Dec. 31, 1940 |
| 2,325,989 | Tyron | Aug. 3, 1943 |
| 2,421,732 | Albert et al. | June 3, 1947 |
| 2,631,184 | Sampson | Mar. 10, 1953 |
| 2,688,793 | Carlson | Sept. 14, 1954 |
| 2,703,997 | Sowter | Mar. 15, 1955 |
| 2,707,889 | Sowter | May 10, 1955 |
| 2,754,393 | Clair | July 10, 1956 |
| 2,763,057 | Clair | Sept. 18, 1956 |
| 2,782,498 | Mushovic et al. | Feb. 26, 1957 |
| 2,783,447 | Watts | Feb. 26, 1957 |

FOREIGN PATENTS

| | | |
|---|---|---|
| 688,400 | Germany | Apr. 28, 1938 |
| 682,313 | Germany | Oct. 12, 1939 |
| 873,867 | France | Apr. 13, 1942 |